(12) United States Patent
Wallace

(10) Patent No.: US 8,587,169 B2
(45) Date of Patent: Nov. 19, 2013

(54) MOTOR ENDSHIELD WITH CAPACITOR RETENTION STRUCTURE

(75) Inventor: Craig E. Wallace, Brighton, IL (US)

(73) Assignee: Nidec Motor Corporation, St. Louis, MO (US)

( * ) Notice: Subject to any disclaimer, the term of this patent is extended or adjusted under 35 U.S.C. 154(b) by 339 days.

(21) Appl. No.: 13/157,992

(22) Filed: Jun. 10, 2011

(65) Prior Publication Data
US 2012/0313468 A1 Dec. 13, 2012

(51) Int. Cl.
*H02K 11/00* (2006.01)

(52) U.S. Cl.
USPC .............................. 310/72; 310/68 R; 310/90

(58) Field of Classification Search
USPC ...................... 310/89, 72, 68 R, 88
See application file for complete search history.

(56) References Cited

U.S. PATENT DOCUMENTS

| | | | |
|---|---|---|---|
| 3,870,392 A | 3/1975 | Bond | |
| 4,593,163 A * | 6/1986 | Fisher | 200/80 R |
| 4,858,303 A * | 8/1989 | Fisher | 29/596 |
| 5,170,307 A | 12/1992 | Nacewicz et al. | |
| 5,245,237 A * | 9/1993 | Fisher et al. | 310/89 |
| 5,278,469 A | 1/1994 | Weber et al. | |
| 5,493,158 A | 2/1996 | Daniels | |
| 6,057,615 A | 5/2000 | Long | |
| 6,215,214 B1 | 4/2001 | Fisher et al. | |
| 6,229,236 B1 | 5/2001 | Fisher et al. | |
| 6,556,425 B2 | 4/2003 | Hudis et al. | |
| 6,717,307 B2 | 4/2004 | Dreher et al. | |
| 6,831,382 B1 * | 12/2004 | Lyle et al. | 310/89 |
| 2003/0007297 A1 | 1/2003 | Herrmann et al. | |

* cited by examiner

*Primary Examiner* — Nguyen N Hanh
(74) *Attorney, Agent, or Firm* — Hovey Williams LLP

(57) ABSTRACT

An electric motor endshield includes a plate and a capacitor-mounting assembly particularly suitable for secure attachment to a capacitor. The mounting assembly includes a lug presenting a capacitor-engaging projection spaced outwardly from the endshield plate. The capacitor-engaging projection presents an inner face in an opposed relationship to the endshield plate to define a capacitor-retaining space therebetween. A peripheral lip of the capacitor housing is received within the capacitor-retaining space, and the housing lip engages the capacitor-engaging projection. The mounting assembly provides secure attachment of the capacitor to the endshield, thereby preventing inadvertent detachment of the capacitor during operation of motor.

22 Claims, 8 Drawing Sheets

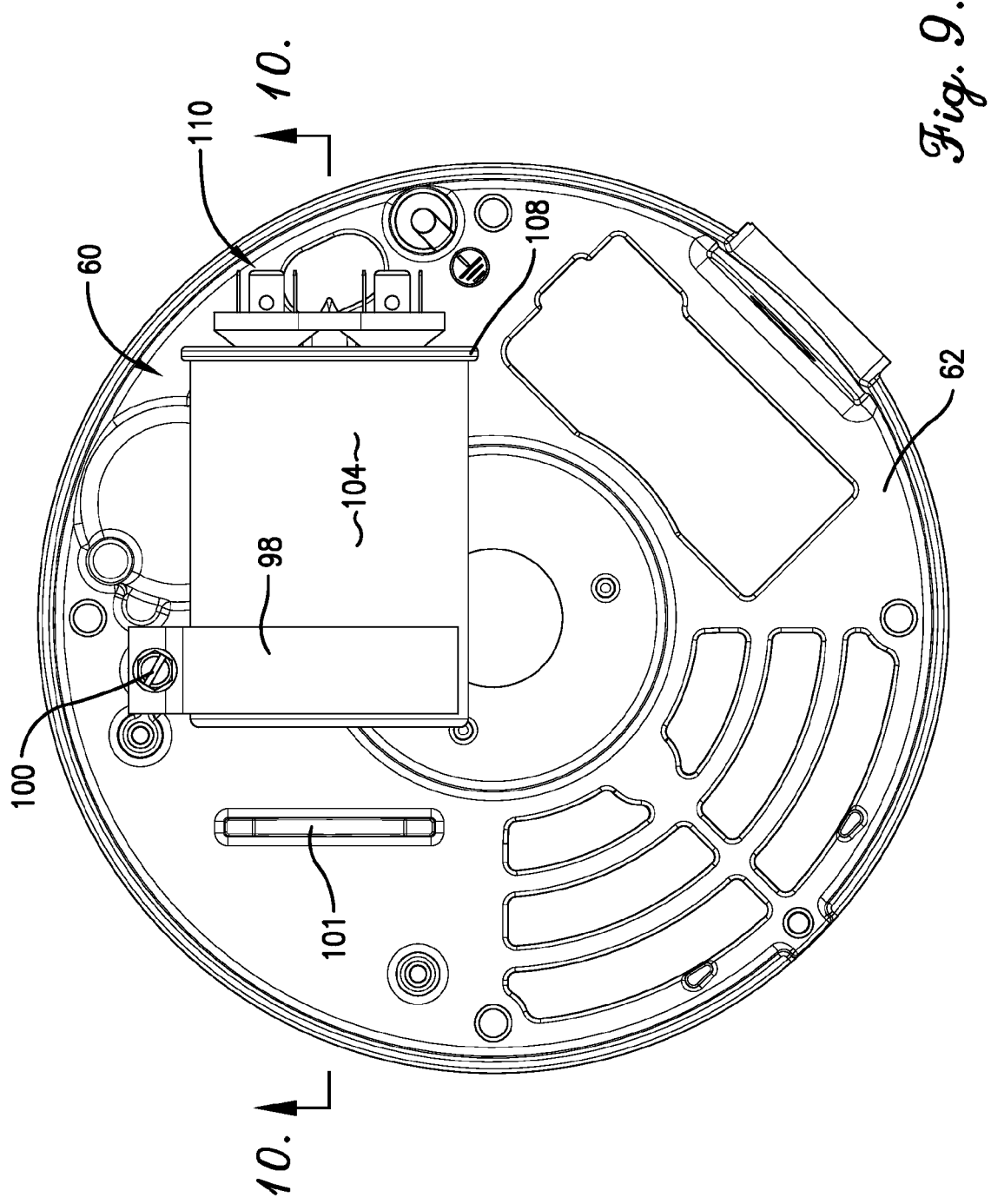

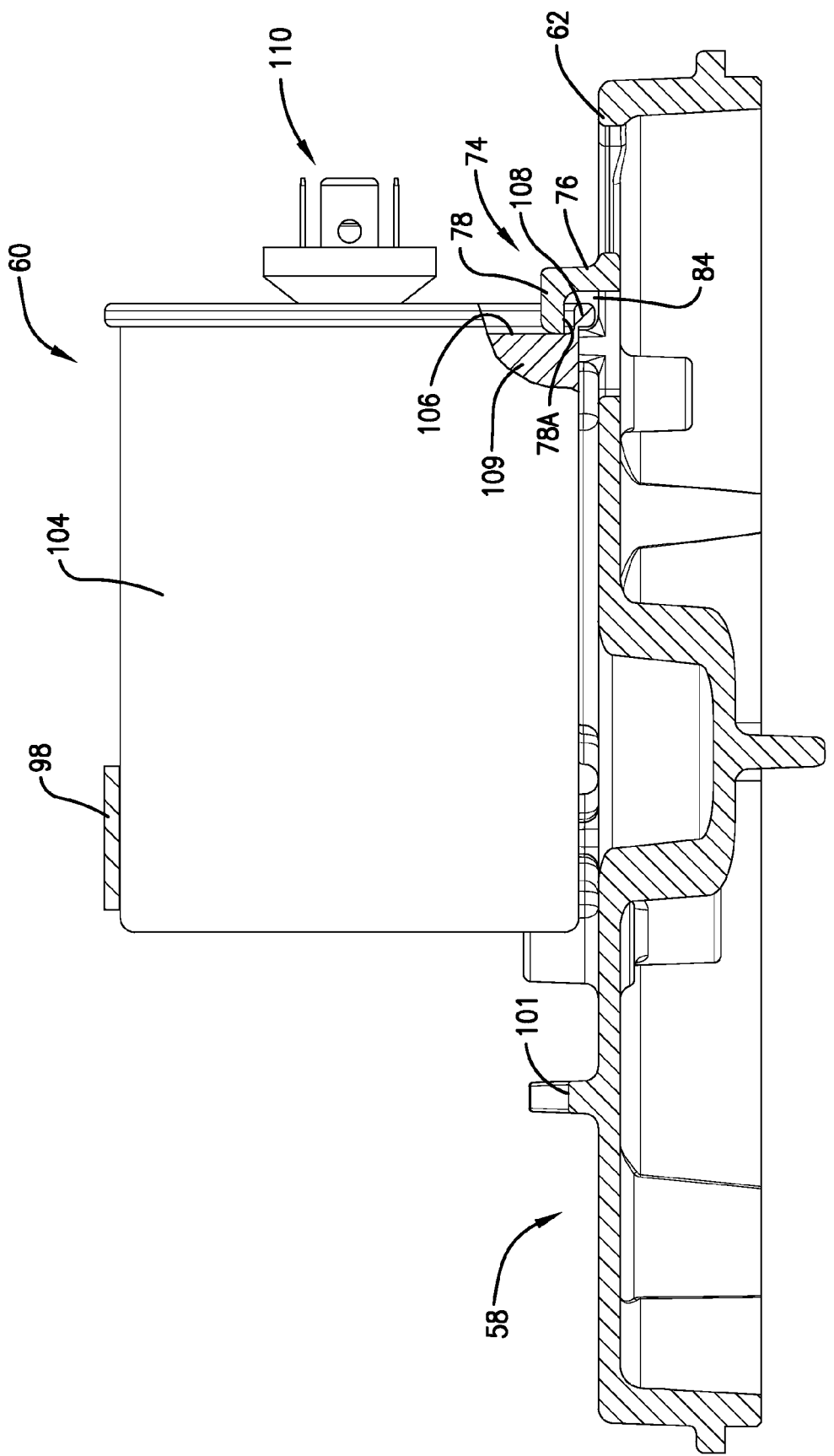

MOTOR ENDSHIELD WITH CAPACITOR RETENTION STRUCTURE

BACKGROUND OF THE INVENTION

1. Field of the Invention

The present invention is broadly concerned with electric motors. More particularly, the present invention concerns a motor with an endshield permitting secure attachment of components, such as a run capacitor. Yet further, the invention is directed to an endshield which includes mounting structure specifically suitable in securing a modern-day, short-length capacitor to the endshield.

2. Description of the Prior Art

Small electric motors of the type used in household appliances and for powering pool or spa pumps generally include a rotor and stator windings received within a generally tubular motor housing. The ends of the housing are capped by endshields. In one class of these motors, a mounting endshield is provided at one end of the motor housing, with a component-supporting endshield at the opposite end of the housing. The latter may for example support a run capacitor which is energized while the motor is running and increases the efficiency of the motor. It is of course very important that such a capacitor be securely attached to the associated endshield, else motor vibrations and the like will cause the capacitor to separate from the endshield, leading to premature motor failure.

FIGS. 1-4 illustrate one type of prior art motor endshield used for supporting a conventional run capacitor. Referring to these figures, it will be observed that the motor housing endshield 20 is of generally circular configuration and has a mounting assembly 22 for a relatively long capacitor 24. As is common, the capacitor 24 has a tubular housing 26 with a peripheral lip 28. A pair of circuit connectors 30 extend outwardly from the end wall 32 of housing 26.

The capacitor mounting assembly 22 includes a pair of spaced apart cradles 34 and 36. Each of the cradles 34 and 36 has an arcuate surface 34a and 36a, respectively, which is complementally shaped and dimensioned with the capacitor housing 26. A secondary support segment 38 is also provided between the cradles 34 and 36, and similarly has an arcuate surface 38a complemental with the capacitor housing 26. An upright, internally threaded stanchion 40 is positioned adjacent the support segment 38. Finally, an outwardly extending abutment 42 is positioned proximal to the cradle 34, as best seen in FIGS. 1 and 2.

The capacitor 24 is mounted on the endshield 20 by positioning the housing 26 on the cradles 34 and 36 and segment 38, followed by axially shifting the capacitor 24 until the lip 28 comes into contact with the abutment 42. At this point, an arcuate connection strap 44 is positioned over the housing 26 and a screw 46 is used to attach the end of the strap 44 to the stanchion 40.

It will be observed that the abutment 42 of mounting assembly 22 provides no capacitor restraint or locking function, but rather serves merely to assist in positioning the capacitor 22 on the endshield 20. The strap 44 serves as the only means of securing the capacitor in place on the endshield 20.

Recently, capacitor manufacturers have been able to reduce the length of motor run capacitors, as compared with the capacitor illustrated in FIGS. 1-4. However, existing mounting assemblies forming a part of motor endshields cannot properly accommodate these lesser length capacitors, and hence the capacitors cannot be secured to the existing endshields of FIGS. 1-4 with the necessary degree of structural integrity.

Accordingly, there is a need in the art for improved endshield capacitor mounting assemblies which can accept modern-day, shorter length capacitors, and secure these to endshields against vibrations and other forces tending to dislodge the capacitors.

SUMMARY OF THE INVENTION

The present invention overcomes the problems outlined above and provides electric motor endshields, endshields in combination with short-length capacitors, and electric motors including the endshields and capacitors.

According to a first aspect of the present invention, an electric motor assembly includes a rotor rotatable about an axis and a stator spaced radially from the rotor. The motor assembly further includes a case defining an internal motor chamber in which the stator and rotor are housed, with the case presenting axial margins. The case includes an endshield adjacent one of the axial margins. The endshield includes a plate with a capacitor-mounting assembly thereon. The capacitor-mounting assembly includes a lug presenting a capacitor-engaging projection spaced outwardly from the endshield plate. The capacitor-engaging projection presents an inner face in an opposed relationship to the endshield plate to define a capacitor-retaining space therebetween. The motor assembly further comprises a capacitor including a housing with a peripheral lip. The housing lip is located within the capacitor-retaining space, with the housing lip engaging the capacitor-engaging projection.

The present invention similarly concerns the combination of an endshield to be positioned adjacent an axial margin of a motor case and a capacitor mounted on the endshield.

The endshield includes a plate with a capacitor-mounting assembly thereon. The capacitor-mounting assembly includes a lug presenting a capacitor-engaging projection spaced outwardly from the endshield plate. The capacitor-engaging projection presents an inner face in an opposed relationship to the endshield plate to define a capacitor-retaining space therebetween. The capacitor includes a housing with a peripheral lip. The housing lip is located within the capacitor-retaining space, with the housing lip engaging the capacitor-engaging projection.

In yet a further aspect of the present invention, an electric motor endshield is configured to be positioned adjacent an axial margin of a motor case and is operable to support a capacitor thereon. The endshield comprises a plate with a capacitor-mounting assembly thereon. The capacitor-mounting assembly includes a lug presenting a capacitor-engaging projection spaced outwardly from the endshield plate. The capacitor-engaging projection presents an inner face in an opposed relationship to the endshield plate to define a capacitor-retaining space therebetween. The capacitor-retaining space is configured to receive the housing lip of a capacitor, with the capacitor-engaging projection engaging the housing lip.

The endshield mounting assembly is particularly well-suited to support a short-length capacitor having the peripheral lip at an end of the housing. In preferred forms, the capacitor mounting assembly includes a pair of capacitor-supporting segments adjacent and on opposite sides of the lug, as well as a support segment spaced from the lug. Each of the lugs preferably has a support surface complemental with the capacitor housing. In use, the housing wall is placed on the support segments and shifted so that the lip is received within the space between the lug projection and endshield plate. A clamping strap is then placed over the capacitor sidewall and attached to the endshield plate, firmly securing the capacitor to the endshield.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 9 is an elevational view of the preferred endshield and capacitor assembly; and FIG. 10 is a sectional view taken along line 10-10 of FIG. 9.

Figure 1:
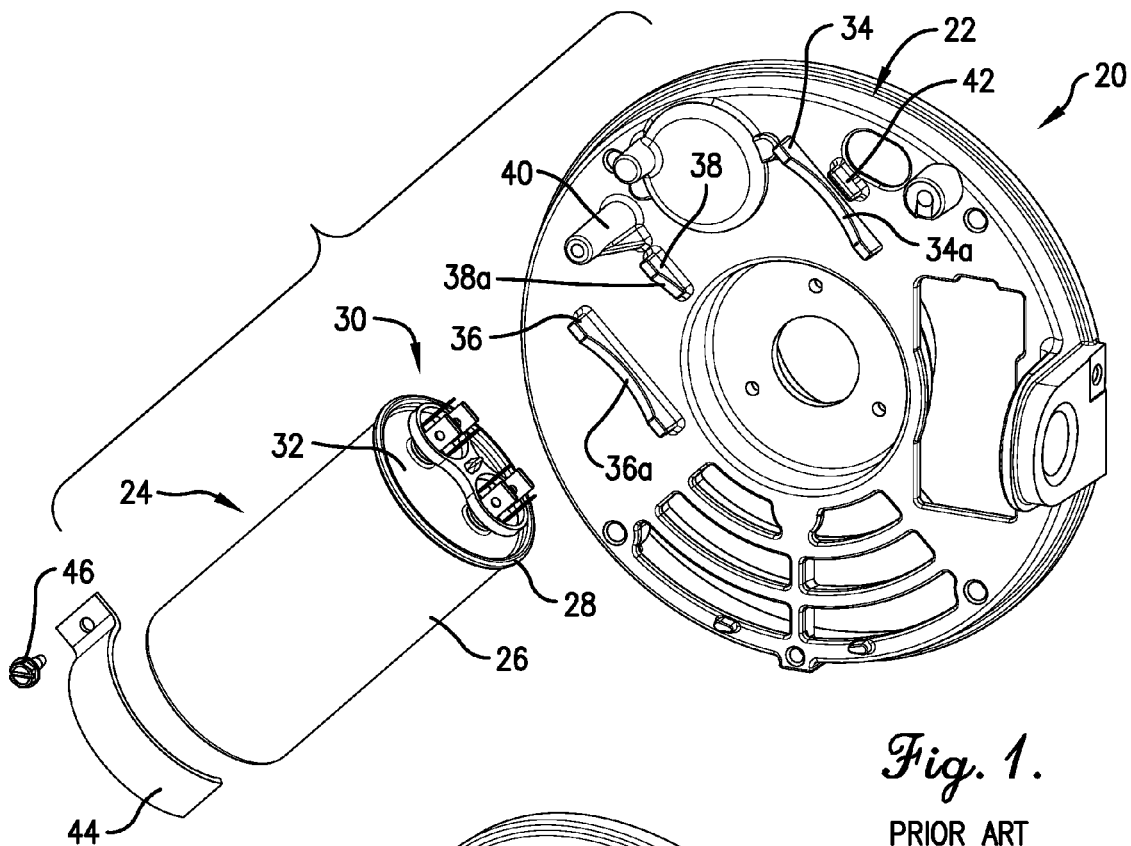
FIG. 1 is an exploded perspective view of a prior art motor endshield and capacitor.
Figure 2:
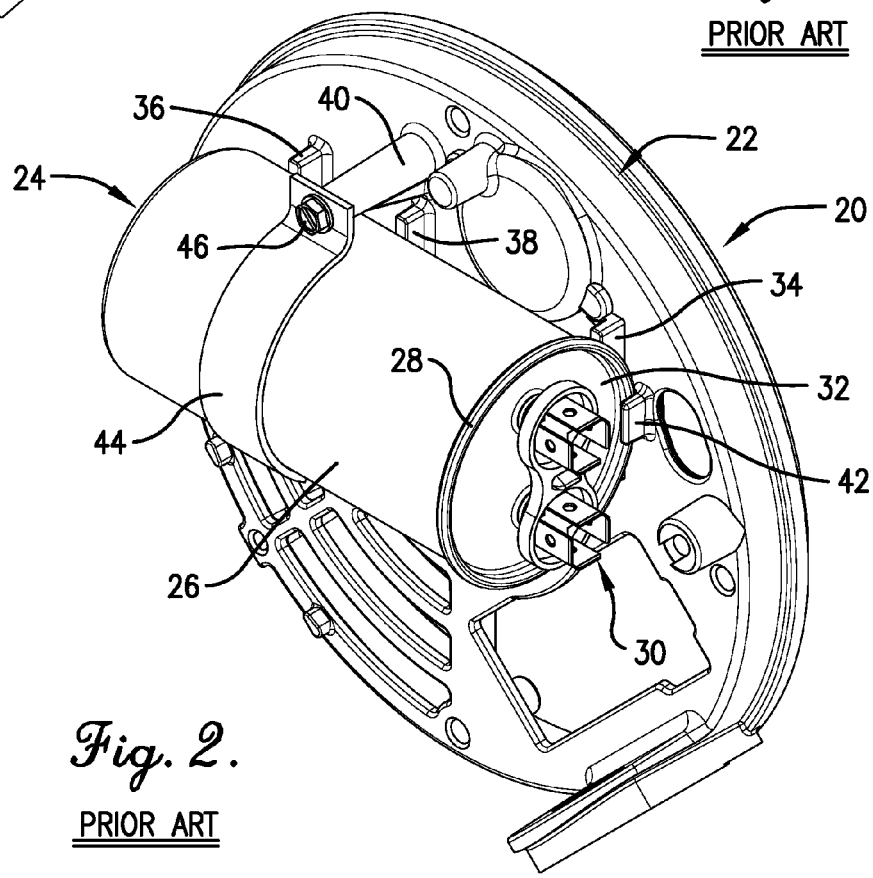
FIG. 2 is a perspective view similar to that of FIG. 1, but depicting the run capacitor installed on the prior art endshield.
Figure 3:
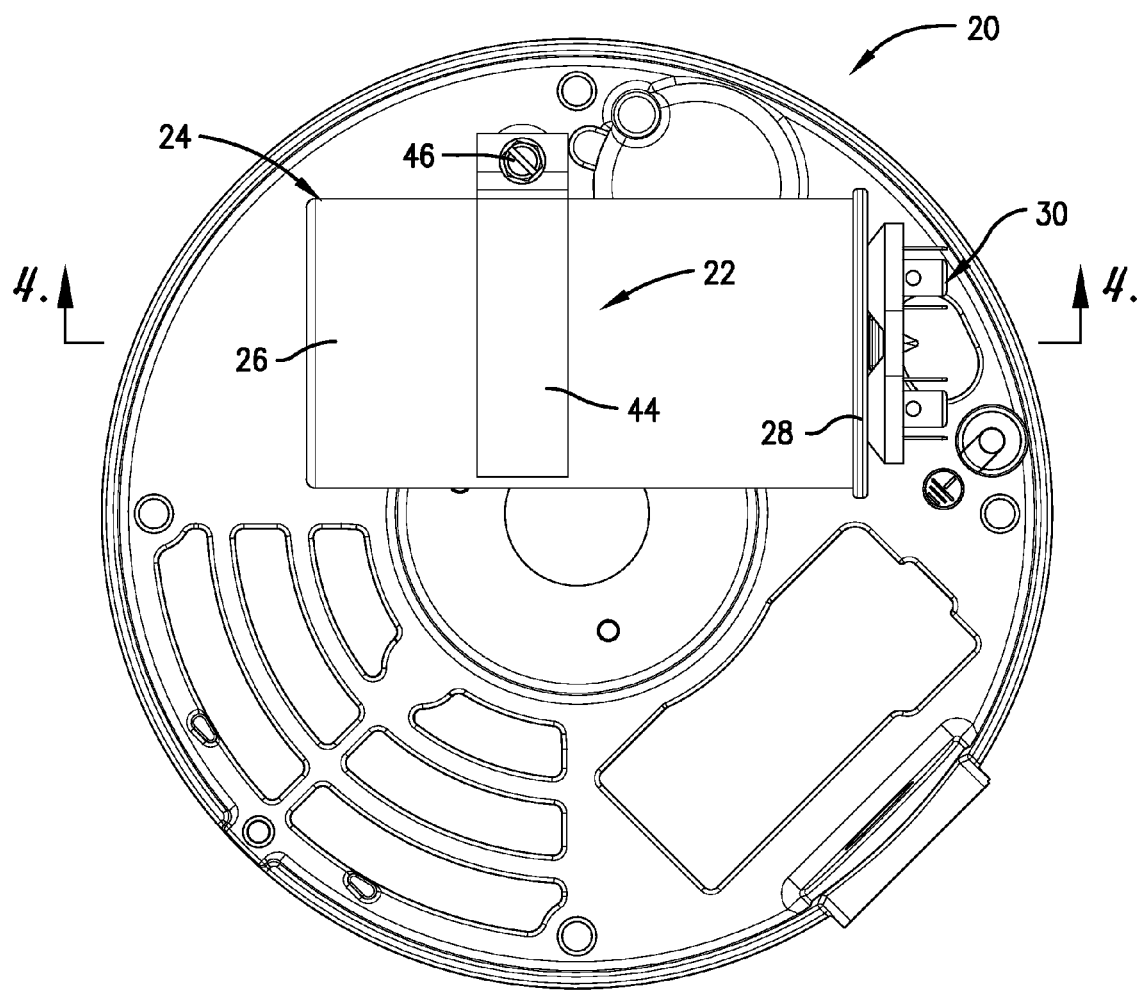
FIG. 3 is an elevational view of the prior art assembly illustrated in FIG. 2.
Figure 4:
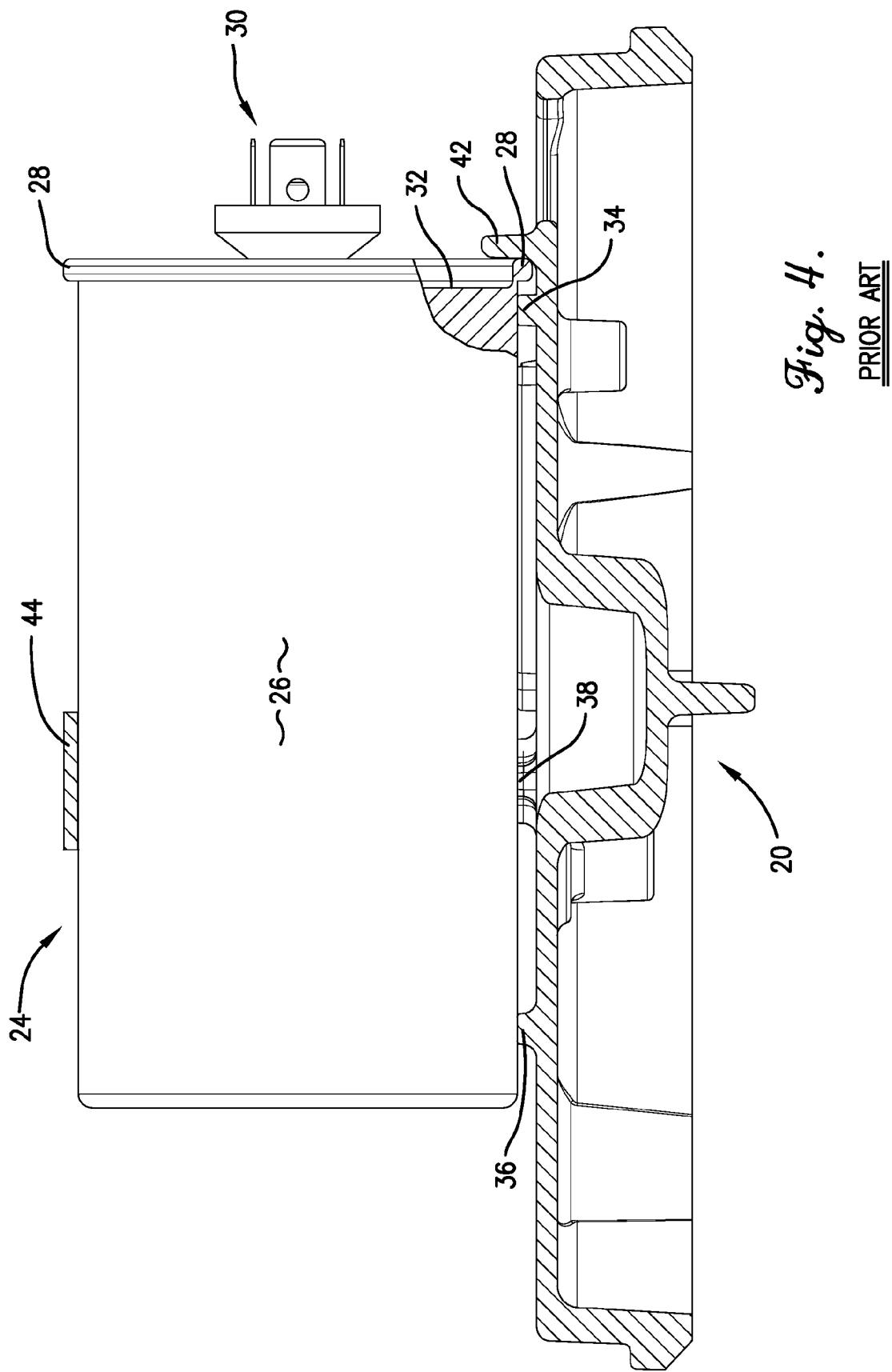
FIG. 4 is a sectional view taken along the line 4-4 of FIG. 3.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENT

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 5:
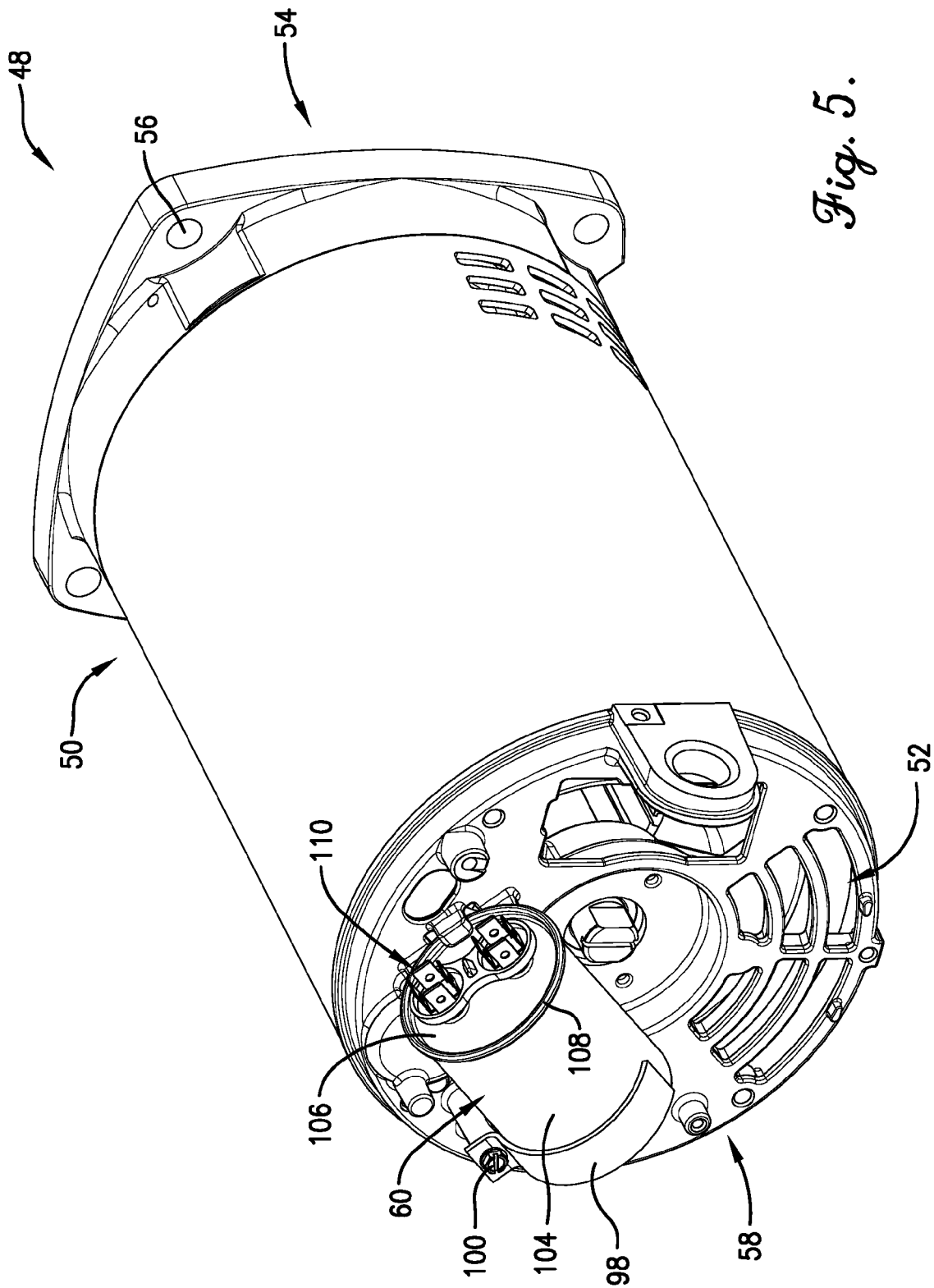
FIG. 5 is a perspective view of an electric motor including an endshield constructed in accordance with a preferred embodiment of the present invention, wherein the endshield is installed adjacent one end of the motor case, with a short-length capacitor secured to the endshield.
Figure 6:
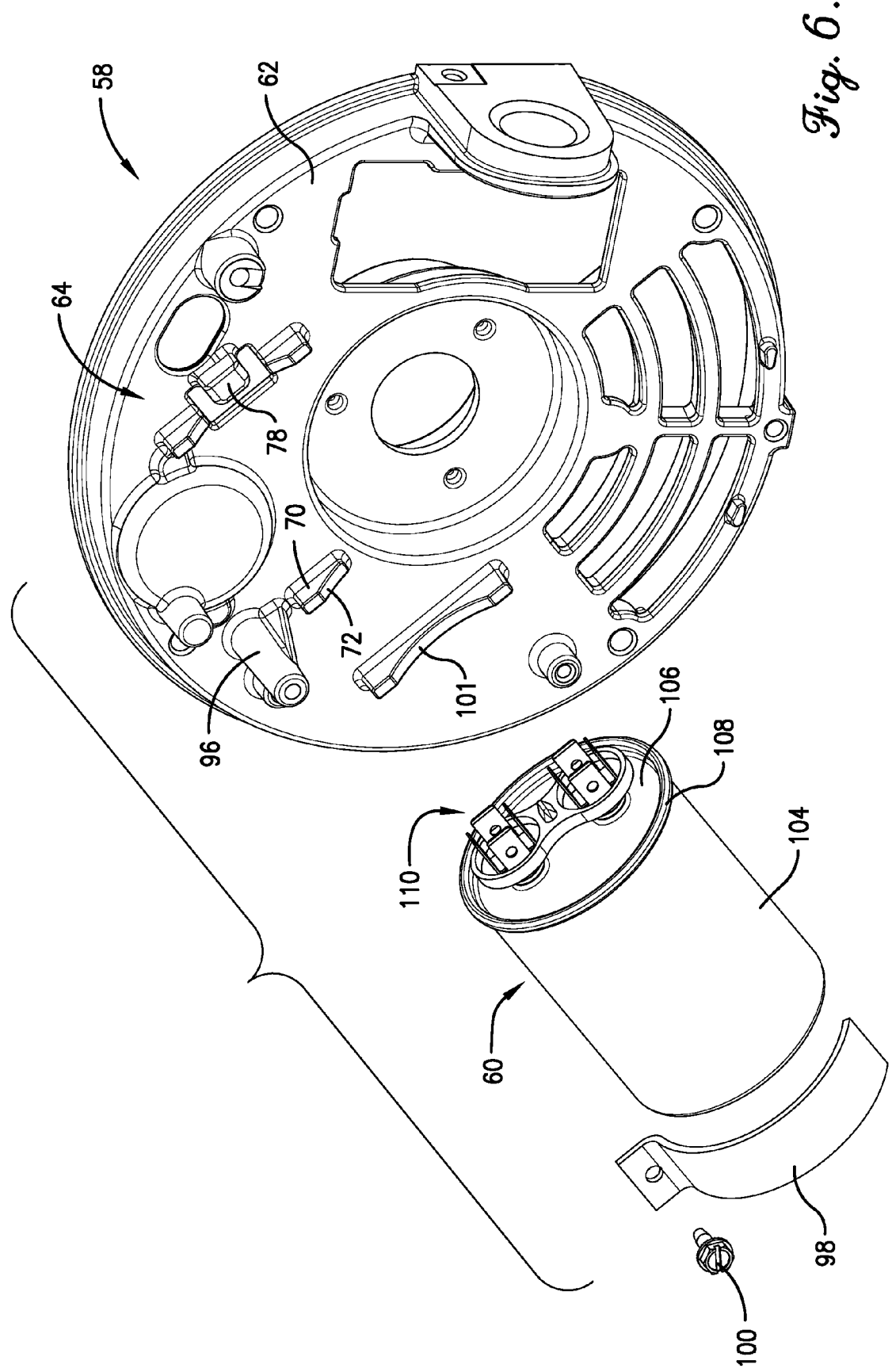
FIG. 6 is an exploded perspective view of the endshield and capacitor depicted in FIG. 5.

Turning now to the drawings, an overall electric motor 48 in accordance with a preferred embodiment of the present invention is illustrated in FIG. 5. The motor 48 broadly includes a motor case 50 receiving the usual rotor/stator motor mechanism 52 therein. In the illustrated embodiment, one end of the case 50 is equipped with a metallic plate-like mounting endshield 54 equipped with corner mounting apertures 56 allowing the entire motor 48 to be secured within a machine or the like. The other end of case 50 has a component-supporting endshield 58. The endshield 58 is also preferably made of metal and, in the illustrated embodiment, is particularly designed to support a capacitor 60. Although the illustrated capacitor 60 is depicted as a modern, short-length motor run capacitor, it will be understood that the principles of the present invention are not necessarily limited to such a component (e.g., it is within the ambit of the present invention to mount an alternative capacitor on the endshield 58). Although not shown, it will be appreciated that endshield 58 and capacitor 60 may be covered by a removable end cap, which may be of the general type illustrated in U.S. Pat. No. 5,278,469.

Figure 7:
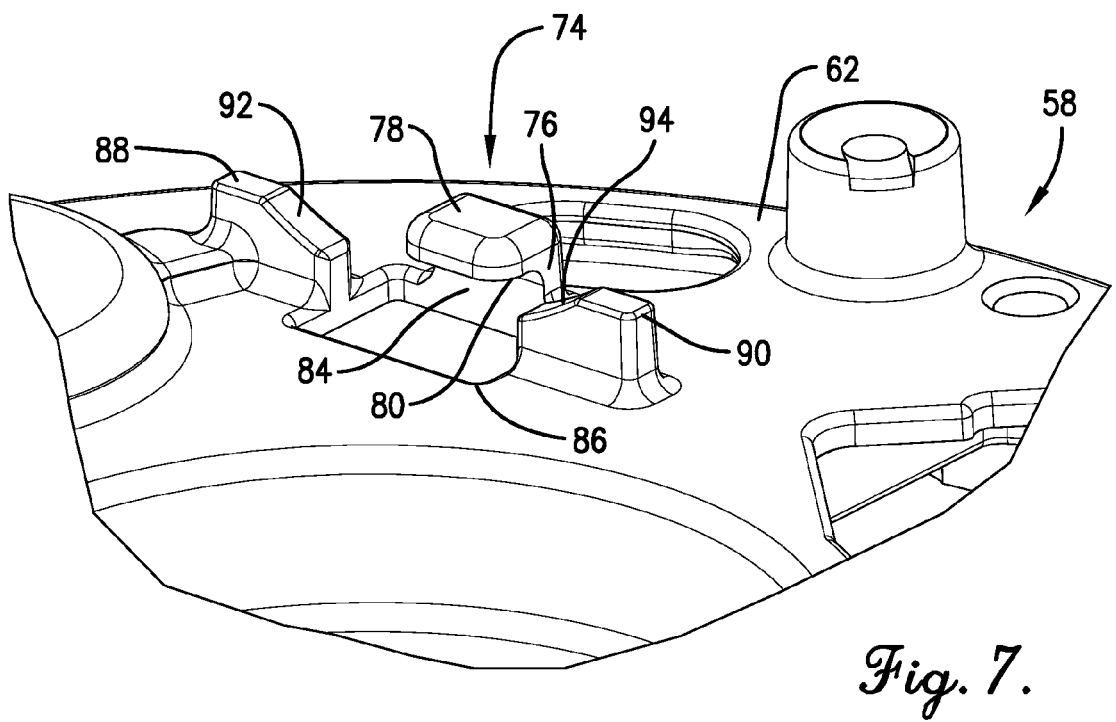
FIG. 7 is a greatly enlarged, fragmentary perspective view depicting the capacitor connection lug assembly of the preferred endshield.
Figure 8:
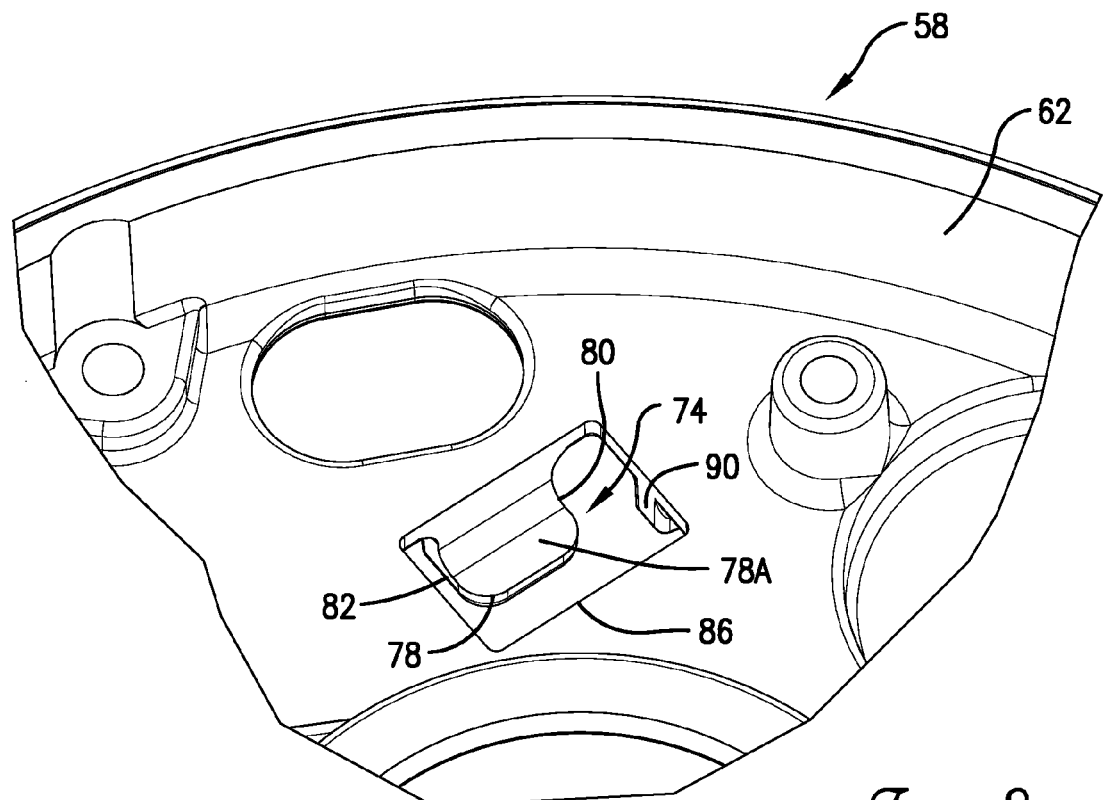
FIG. 8 is an enlarged, fragmentary perspective view similar to that of FIG. 7, but depicting the side of the endshield opposite that of FIG. 7.

The endshield 58 includes a central plate section 62 supporting a capacitor-mounting assembly 64. The preferred mounting assembly 64 includes an outwardly extending support segment 70 having an arcuate support surface 72. In addition, the mounting assembly 64 has a lug 74 (see FIGS. 7 and 8) spaced from the segment 70. In the illustrated embodiment, the lug 74 has an inverted, generally L-shaped configuration, although other lug shapes and dimensions are within the scope of the present invention, as will be subsequently described. The illustrated lug 74 includes a leg 76 extending outwardly from plate section 62 and a transversely extending, capacitor-engaging projection 78 spaced from the section 62. The projection 78 has a pair of opposed side edges 80 and 82, between which an inner surface 78a of the projection 78 is defined. A capacitor-retaining space 84 is thus defined between the inner surface 78a and the plate section 62. Again, the shape and configuration of the lug 74 may be altered without departing from the scope of the present invention, as long as the lug 74 presents the inner surface 78a spaced from the plate section 62 so as to define the capacitor-retaining space 84. For example, the leg 76 may alternatively extend obliquely from the plate section 62 or be replaced entirely with alternative structure that spaces the inner surface 78a from the plate section 62. Furthermore, the inner surface 78a may also be alternatively configured without departing from the spirit of the present invention. For example, it is not necessary for the inner surface 78a to have the generally rectangular, flat configuration that is generally parallel to the plate section 62, as depicted in the preferred embodiment. For example, if desired, the inner surface 78a could be provided with corrugations, angled relative to the plate section 62, be non-polygonal in shape, etc.

The illustrated endshield 58 is preferably formed of a casting process. More preferably, the endshield 58 is cast of metal and, most preferably, of aluminum. However, the endshield may alternatively be formed of other suitable techniques (e.g., stamped) and materials (e.g., non-metals, such as synthetic or composite materials). Inasmuch as the illustrated lug 74 is formed by a casting procedure, an opening 86 is preferably formed in the plate section 60 immediately adjacent the lug. A pair of outwardly extending support segments 88 and 90 are provided on opposite sides of the opening 86 and in close adjacency to lug 74. In order to complement the shape of the illustrated capacitor 60, the segments 88 and 90 preferably have outer arcuate support surfaces 92 and 94, respectively. The overall mounting assembly 64 also includes an upstanding, internally threaded stanchion 96 spaced from lug 74. An arcuate clamping strap 98 is preferably secured to the stanchion by an attachment screw 100. With the stanchion 96, and therefore the strap 98, being spaced from the lug 74, the capacitor is preferably clamped at a point spaced from the lug 74. And in the case of the illustrated modern, short-length capacitor 60, it is clamped adjacent the end opposite the lug 74.

It is noted that the endshield 58 is also provided with a cradle 101 that is spaced further from the lug 74 than the segment 70. Those of ordinary skill in the art will appreciate that the cradle 101 permits the endshield 58 to also be used with the more traditional capacitor 24, as depicted in FIGS. 1-4.

The relatively short, run capacitor 60 has a substantially cylindrical sidewall 104 and an end plate 106. Projecting axially beyond the end plate 106 is a peripheral lip 108. That is, the end plate 106 is slightly recessed, with the lip 108 providing a circumferential, axial projection. If desired, the lip 108 may have alternative forms without departing from the spirit of the present invention (e.g., the lip 108 need not extend continuously about the circumference of the capacitor, the sidewall and lip need not be circular in cross-sectional shape, etc.). The capacitor 60 also has conventional, internal capacitive components 109 and outwardly projecting circuit connectors 110, as shown in FIG. 10.

In order to mount the capacitor 60 to the endshield 58, the capacitor 60 is placed on segments 70, 88, and 90, with the respective support surfaces 72, 92, and 94 complementally mating with the capacitor sidewall 104. It is noted that if the capacitor 60 is provided with an alternatively shaped and/or dimensioned sidewall, the surfaces 72, 92, and 94 are appropriately modified to complement the alternative design. Because the illustrated lip 108 also projects somewhat radially relative to the sidewall 104, the capacitor 60 may need to be oriented and moved at a slight angle relative to the endshield 58 so that the lip can be positioned both under the inner surface 78a (within the capacitor-retaining space 84) and the sidewall onto the support surfaces 72, 92, and 94. Once the capacitor 60 is resting on the surfaces 72, 92, and 94, the capacitor 60 is preferably shifted axially so that the lip 108 is moved into engagement with the leg 76 (see, FIG. 10). Next, the clamping strap 98 is positioned in overlying relationship to the housing 104 and is secured to stanchion 96 by screw 100.

In this regard, when the capacitor 60 is secured to the endshield 58, the peripheral lip 108 comes into bearing contact with the side edges 80 and 82 of the projection 78. Because the illustrated lip 108 is circular in shape, while the inner surface 78a is flat, the portion of the lip 108 between the side edges 80 and 82 extends within the space 84 but does not contact the inner surface of the projection 78. If desired, however, the inner surface 78a and lip 108 may alternatively be designed to have a complemental shape (e.g., the inner surface may alternatively have an arcuate shape with the same radius of curvature as the peripheral lip 108) so that the surface 78a and lip 108 continuously engage one another between the side edges. Returning to the illustrated embodiment, the lug 74 provides essentially tangential point contact with the lip 108 at spaced locations thereon. It has been found that this type of point contact, together with the compressive force generated by the clamping strap 98, serves to firmly secure the capacitor 60 in place on the endshield 58 against all normal vibrations and shocks attendant to operation of motor 48.

While the invention has been described in the context of mounting a run capacitor on an electric motor endshield, it will be appreciated that the mounting assembly hereof could also be used for the support of a start capacitor, if desired.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. An electric motor assembly comprising:
   a rotor rotatable about an axis;
   a stator spaced radially from the rotor;
   a case defining an internal motor chamber in which the stator and rotor are housed, with the case presenting axial margins,
   said case including an endshield adjacent one of said axial margins,
   said endshield including a plate with a capacitor-mounting assembly thereon,
   said capacitor-mounting assembly including a lug that presents a capacitor-engaging projection spaced outwardly from the endshield plate,
   said capacitor-engaging projection presenting an inner face in an opposed relationship to the endshield plate to define a capacitor-retaining space therebetween; and
   a capacitor including a housing with a peripheral lip,
   said housing lip located within the capacitor-retaining space, with the housing lip engaging the capacitor-engaging projection.

2. The electric motor assembly as claimed in claim 1,
   said capacitor-mounting assembly including a pair of capacitor-supporting segments adjacent and on opposite sides of the lug,
   each of said capacitor-supporting segments having a surface complementally engaging the capacitor housing adjacent the lip.

3. The electric motor assembly as claimed in claim 1,
   said capacitor-mounting assembly including a segment in spaced relationship to the lug,
   said segment having a surface complementally engaging the capacitor housing at a region thereof remote from the peripheral lip.

4. The electric motor assembly as claimed in claim 1,
   said projection presenting a pair of side margins,
   said peripheral lip being substantially circular and engaging the side margins.

5. The electric motor assembly as claimed in claim 1,
   said capacitor-mounting assembly including a strap engaging the capacitor at a point remote from the peripheral lip, with an end of the strap being secured to the endshield plate.

6. The electric motor assembly as claimed in claim 5,
   said endshield plate having a threaded stanchion,
   said strap being secured to the stanchion by a threaded coupler.

7. The electric motor assembly as claimed in claim 1,
   said lug presenting an inverted, generally L-shaped configuration,
   said lug including a leg extending outwardly from the endshield plate, with the capacitor-engaging projection extending from said leg adjacent an end thereof spaced from the endshield plate.

8. The electric motor assembly as claimed in claim 7,
   said housing lip of the capacitor being located at an end of the housing and engaging the leg.

9. In combination:
an endshield to be positioned adjacent an axial margin of a motor case,
said endshield including a plate with a capacitor-mounting assembly thereon,
said capacitor-mounting assembly including a lug that presents a capacitor-engaging projection spaced outwardly from the endshield plate,
said capacitor-engaging projection presenting an inner face in an opposed relationship to the endshield plate to define a capacitor-retaining space therebetween; and
a capacitor including a housing with a peripheral lip,
said housing lip located within the capacitor-retaining space, with the housing lip engaging the capacitor-engaging projection.

10. The combination as claimed in claim 9,
said capacitor-mounting assembly including a pair of capacitor-supporting segments adjacent and on opposite sides of the lug,
each of said capacitor-supporting segments having a surface complementally engaging the capacitor housing adjacent the lip.

11. The combination as claimed in claim 9,
said capacitor-mounting assembly including a segment in spaced relationship to the lug,
said segment having a surface complementally engaging the capacitor housing at a region thereof remote from the peripheral lip.

12. The combination as claimed in claim 9,
said projection presenting a pair of side margins,
said peripheral lip being substantially circular and engaging the side margins.

13. The combination as claimed in claim 9,
said capacitor-mounting assembly including a strap engaging the capacitor at a point remote from the peripheral lip, with an end of the strap being secured to the endshield plate.

14. The combination as claimed in claim 13,
said endshield plate having a threaded stanchion,
said strap being secured to the stanchion by a threaded coupler.

15. The combination as claimed in claim 9,
said lug presenting an inverted, generally L-shaped configuration,
said lug including a leg extending outwardly from the endshield plate, with the capacitor-engaging projection extending from said leg adjacent an end thereof spaced from the endshield plate.

16. The combination as claimed in claim 15,
said housing lip of the capacitor being located at an end of the housing and engaging the leg.

17. An electric motor endshield configured to be positioned adjacent an axial margin of a motor case and operable to support a capacitor thereon, wherein the capacitor includes a housing with a peripheral lip, said endshield comprising:
a plate with a capacitor-mounting assembly thereon,
said capacitor-mounting assembly including a lug that presents a capacitor-engaging projection spaced outwardly from the endshield plate,
said capacitor-engaging projection presenting an inner face in an opposed relationship to the endshield plate to define a capacitor-retaining space therebetween,
said capacitor-retaining space being configured to receive the housing lip of the capacitor, with the capacitor-engaging projection engaging the housing lip.

18. The endshield as claimed in claim 17,
said capacitor-mounting assembly including a pair of capacitor-supporting segments adjacent and on opposite sides of the lug,
each of said capacitor-supporting segments having a surface configured to complementally engage the capacitor housing adjacent the lip.

19. The endshield as claimed in claim 17,
said capacitor-mounting assembly including a segment in spaced relationship to the lug,
said segment having a surface configured to complementally engage the capacitor housing at a region thereof remote from the peripheral lip.

20. The endshield as claimed in claim 17,
said capacitor-mounting assembly including a strap configured to engage the capacitor at a point remote from the peripheral lip, with an end of the strap being secured to the plate.

21. The endshield as claimed in claim 20,
said plate having a threaded stanchion,
said strap being secured to the stanchion by a threaded coupler.

22. The endshield as claimed in claim 17,
said lug presenting an inverted, generally L-shaped configuration,
said lug including a leg extending outwardly from the endshield plate, with the capacitor-engaging projection extending from said leg adjacent an end thereof spaced from the endshield plate.

* * * * *